US012455525B2

(12) United States Patent
Kobayashi et al.

(10) Patent No.: US 12,455,525 B2
(45) Date of Patent: Oct. 28, 2025

(54) IMAGE FORMING APPARATUS

(71) Applicant: CANON KABUSHIKI KAISHA, Tokyo (JP)

(72) Inventors: Shinsuke Kobayashi, Kanagawa (JP); Toshihiko Takayama, Kanagawa (JP); Kensuke Umeda, Kanagawa (JP); Ai Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/473,110

(22) Filed: Sep. 22, 2023

(65) Prior Publication Data

US 2024/0111236 A1 Apr. 4, 2024

(30) Foreign Application Priority Data

Sep. 28, 2022 (JP) ................................. 2022-154909

(51) Int. Cl.
*G03G 15/00* (2006.01)

(52) U.S. Cl.
CPC ..... *G03G 15/5008* (2013.01); *G03G 15/5004* (2013.01); *G03G 2215/025* (2013.01)

(58) Field of Classification Search
CPC ........... G03G 21/0035; G03G 21/0064; G03G 15/065; G03G 2221/0005
See application file for complete search history.

(56) References Cited

U.S. PATENT DOCUMENTS 12,197,160 B2 * 1/2025 Takayama .......... G03G 15/0216
2004/0264986 A1 * 12/2004 Sasai ................ G03G 15/04072 399/92
2004/0264989 A1 * 12/2004 Sasai .................. G03G 21/0064 399/92
2008/0118272 A1 * 5/2008 Komatsu ............ G03G 21/0064 399/150

(Continued)

FOREIGN PATENT DOCUMENTS

JP 2001189358 A 7/2001
JP 2007328260 A 12/2007

(Continued)

*Primary Examiner* — Jessica L Eley
(74) *Attorney, Agent, or Firm* — Canon U.S.A., Inc., IP Division

(57) ABSTRACT

An image forming apparatus includes a photosensitive drum, a charging member, a developing member, a transfer member, a brush, a drive unit, a control unit, and a memory. The charging member charges a surface of the photosensitive drum at a charging portion. The transfer member comes into contact with the photosensitive drum to form a transfer portion. The drive unit rotatably drive the photosensitive drum. The control unit controls the drive unit to perform an image forming operation. The memory stores information about the image forming operation. In a case where the image forming operation is performed and a non-image forming operation is performed after the image forming operation, the control unit performs control such that a switching operation for stopping the photosensitive drum after the photosensitive drum is driven and re-driving the (Continued)

photosensitive drum is performed a plurality of times based on the information about the image forming operation.

9 Claims, 7 Drawing Sheets

(56) References Cited

U.S. PATENT DOCUMENTS

| | | | | |
|---|---|---|---|---|
| 2011/0129247 | A1* | 6/2011 | Soures | G03G 15/50 399/71 |
| 2011/0280637 | A1* | 11/2011 | Ishizuka | G03G 21/0094 399/346 |
| 2014/0064769 | A1* | 3/2014 | Sugiura | G03G 15/168 399/101 |
| 2024/0111240 | A1 | 4/2024 | Takayama | |

FOREIGN PATENT DOCUMENTS

| | | | |
|---|---|---|---|
| JP | 2008076689 | A | 4/2008 |
| JP | 2022129372 | A | 9/2022 |
| KR | 20170041147 | A | 4/2017 |

* cited by examiner

IMAGE FORMING APPARATUS

BACKGROUND

Field

The present disclosure relates to an image forming apparatus using an electrophotographic recording method, such as a laser beam printer, copying machine, and facsimile.

Description of the Related Art

An image forming apparatus using an electrophotographic method uniformly charges a photosensitive drum serving as an image carrier and then exposes the photosensitive drum to light according to an image pattern to form an electrostatic latent image on the photosensitive drum. Thereafter, the image forming apparatus develops the electrostatic latent image on the photosensitive drum by using toner to visualize the image, and transfers the image onto a recording material such as paper. As a means for collecting residual transfer toner remaining on the photosensitive drum, a cleaner-less method (a method in which cleaning is performed concurrently with development) is known in which residual toner is collected by a development apparatus at a developing portion and then reused. In the cleaner-less method, paper fiber and filler (hereinafter referred to as "paper dust") adhering to the photosensitive drum may cause trouble in the subsequent image forming process. Japanese Patent Application Laid-Open No. 2001-189358 discusses a technique for collecting paper dust on a photosensitive drum by using a brush member in contact with the surface of the photosensitive drum, thus reducing the amount of paper dust that reaches a charging portion and a developing portion downstream of a transfer portion.

The technique discussed in Japanese Patent Application Laid-Open No. 2001-189358, however, has the following issues. When a recording material is fed in a configuration where a cleaning brush is in contact with the photosensitive drum, paper dust accumulates at a brush nip portion. Then, the accumulated paper dust clumps into paper dust lumps at the brush nip portion. As the paper dust lumps increase in size, the cleaning brush can no longer hold them, and the paper dust lumps pass through the brush during a printing operation, which can cause image defects.

SUMMARY

The present disclosure is directed to preventing image defects caused by paper dust accumulating on a brush.

Preventing image defects is achieved by an electrophotographic image forming apparatus according to the present disclosure.

According to an aspect of the present disclosure, an image forming apparatus includes a photosensitive drum that is rotatable, a charging member configured to charge a surface of the photosensitive drum at a charging portion, a developing member configured to supply toner onto the surface of the photosensitive drum charged by the charging member, a transfer member configured to come into contact with the photosensitive drum to form a transfer portion, and transfer the toner supplied onto the photosensitive drum to a transfer material at the transfer portion, a brush configured to come into contact with the surface of the photosensitive drum downstream of the transfer portion and upstream of the charging portion in a rotational direction of the photosensitive drum, a drive unit configured to rotatably drive the photosensitive drum, a control unit configured to control the drive unit to perform an image forming operation, and a memory configured to store information about the image forming operation, wherein, in a case where the image forming operation is performed and a non-image forming operation is performed after the image forming operation, the control unit performs control such that a switching operation for stopping the photosensitive drum after the photosensitive drum is driven and re-driving the photosensitive drum is performed a plurality of times based on the information about the image forming operation.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the accompanying drawings. However, sizes, materials, shapes, and relative arrangements of elements described in the exemplary embodiments are not limited thereto and are to be modified as required depending on the configuration of an apparatus to which the present disclosure is applied and other various conditions. The scope of the present disclosure is not limited to the exemplary embodiments described below.

1. Image Forming Apparatus

Figure 1:
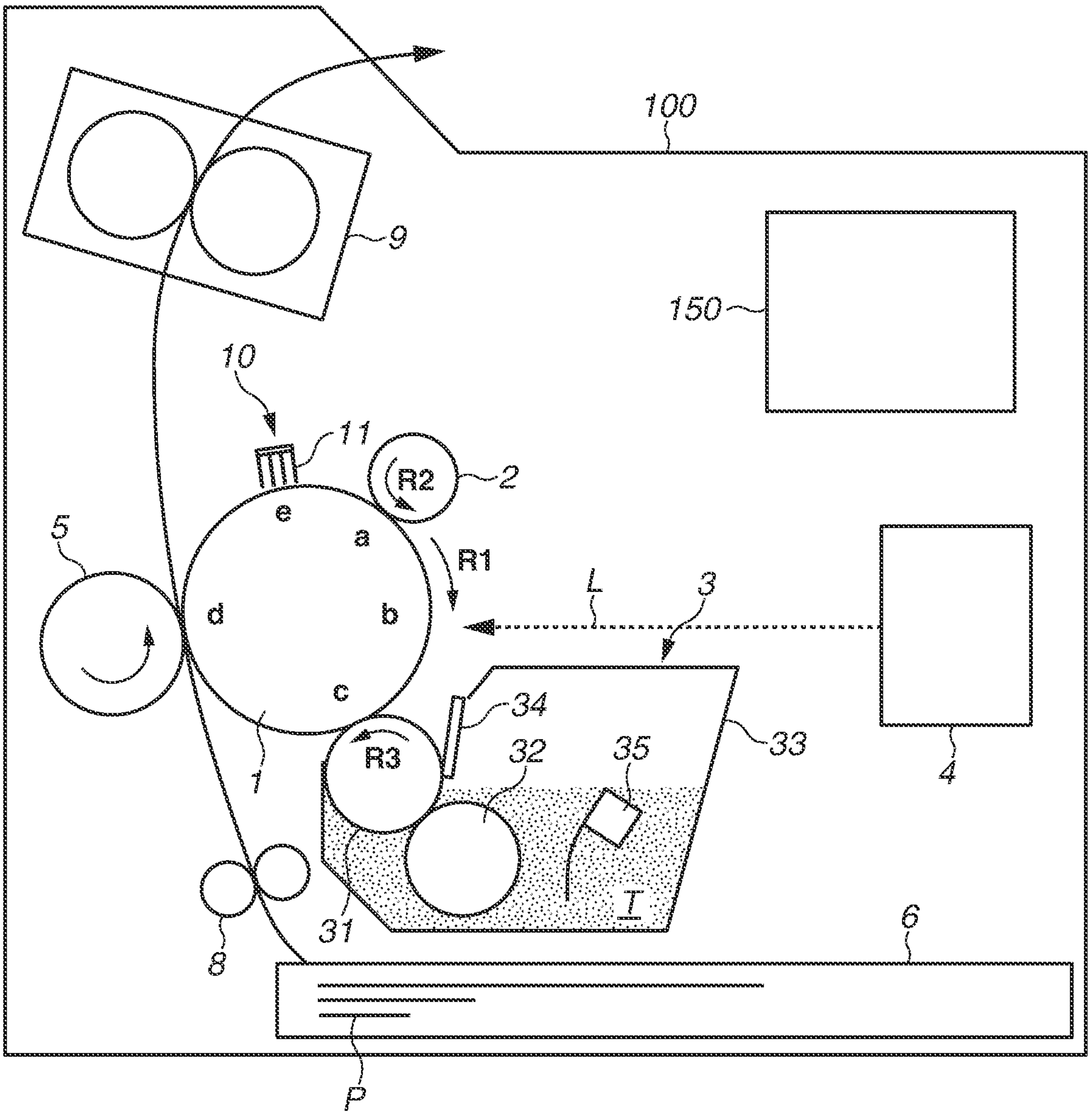
FIG. 1 is a diagram schematically illustrating a cross-section of an image forming apparatus according to a first exemplary embodiment.

FIG. 1 is a diagram illustrating an overall configuration of an image forming apparatus 100 according to a first exemplary embodiment of the present disclosure.

Figure 3:
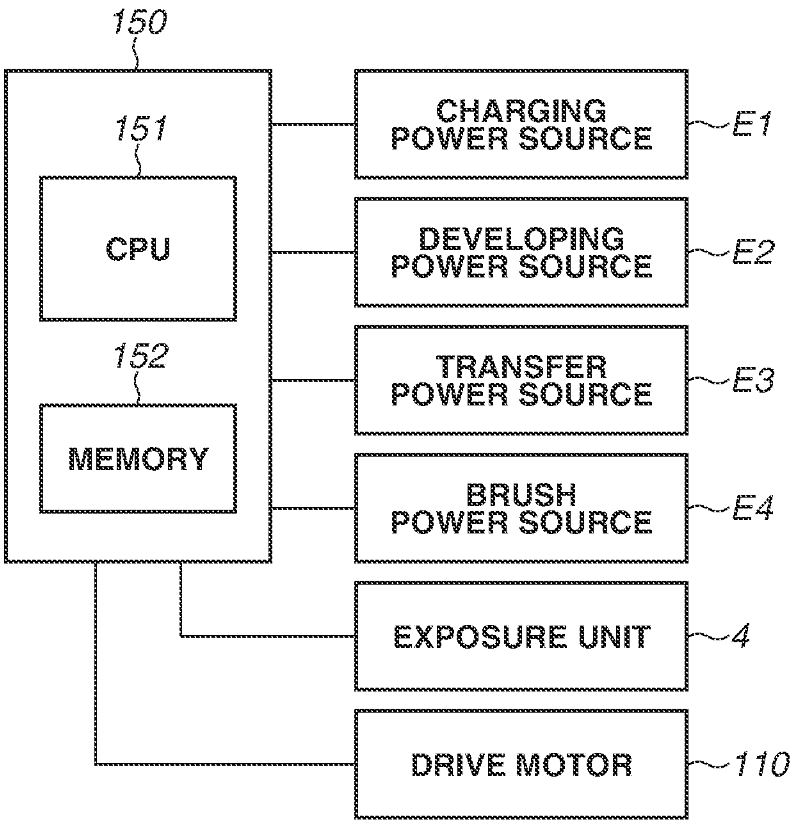
FIG. 3 is a control block diagram according to the first exemplary embodiment.

The image forming apparatus 100 according to the present exemplary embodiment is a monochromatic laser beam printer using a cleaner-less method and a contact charging method. The image forming apparatus 100 includes a photosensitive drum 1 which is an electrophotographic photosensitive member having a drum shape (cylindrical shape) as a rotatable image carrier. When an image output operation is started, the photosensitive drum 1 is rotatably driven in the direction of an arrow R1 by a drive motor 110 (FIG. 3). The outer diameter of the photosensitive drum 1 is 24 mm, and the circumferential speed (surface speed) is 140 mm/second.

The surface of the rotating photosensitive drum 1 is uniformly charged to a predetermined potential having a normal polarity (a negative polarity in the present exemplary embodiment) by a charge roller 2, which is a roller-type charging member serving as a charging unit, in the vicinity of a charging portion a where the photosensitive drum 1 and the charge roller 2 come into contact with each other. More particularly, the charge roller 2 charges the surface of the photosensitive drum 1 due to electric discharge occurring at least either one of small gaps between the charge roller 2 and the photosensitive drum 1 formed upstream and downstream of a contact portion where the charge roller 2 is in contact with the photosensitive drum 1 in the rotational direction of the photosensitive drum 1. However, the following description will be made on an assumption that the contact portion where the charge roller 2 and the photosensitive drum 1 are in contact with each other in the rotational direction of the photosensitive drum 1 is the charging portion a.

The charge roller 2 is an elastic roller formed of a conductive elastic layer around a core metal, and is disposed in contact with the photosensitive drum 1, and rotatably driven in the direction of an arrow R2 in FIG. 1 by the drive motor 110 (FIG. 3). Although, according to the present exemplary embodiment, the charge roller 2 is driven to rotate, the charge roller 2 may be configured to rotate in accordance with the rotation of the photosensitive drum 1. Further, while the drive motor 110 serves as a common driving source to rotatably drive the photosensitive drum 1 and the charge roller 2, a drive motor may be provided individually for each of the photosensitive drum 1 and the charge roller 2. The charge roller 2 is applied with a predetermined charging voltage as a direct-current (DC) voltage having the negative polarity by a charging power source E1 (FIG. 3) as a charging voltage application unit. According to the present exemplary embodiment, the charge roller 2 is applied with a DC voltage having the negative polarity as the charging voltage during charge processing. According to the present exemplary embodiment, the charging voltage is set to, for example, −1,200 V. Thus, according to the present exemplary embodiment, the surface of the photosensitive drum 1 is uniformly charged to a dark portion potential Vd of −600 V.

The charged surface of the photosensitive drum 1 is subjected to scanning exposure with a laser beam L modulated based on image data by an exposure apparatus (laser exposure unit) 4 as an exposure unit (electrostatic image forming unit). The exposure apparatus 4 forms an electrostatic latent image on the photosensitive drum 1 by repeating exposure in the main scanning direction (rotational axis direction) of the photosensitive drum 1 and also performing exposure in the sub scanning direction (surface movement direction) by using the laser beam L. According to the present exemplary embodiment, when the surface of the photosensitive drum 1 is exposed by the exposure apparatus 4, the dark portion potential Vd formed on the uniformly charged surface of the photosensitive drum 1 decreases in the absolute value and becomes a light portion potential V1 of −100 V. The exposure position on the photosensitive drum 1 subjected to exposure by the exposure apparatus 4 in the rotational direction of the photosensitive drum 1 is an image exposure portion b. The exposure apparatus 4 is not limited to a laser scanner apparatus. For example, a light emitting diode (LED) array having a plurality of LEDs arranged in the longitudinal direction of the photosensitive drum 1 may be employed.

An electrostatic latent image formed on the photosensitive drum 1 is developed (visualized) into a toner image by a development apparatus 3 serving as a developing unit using toner T as a developer. For the toner T as a developer according to the present exemplary embodiment, spherical non-magnetic toner having an average particle diameter of 6.4 μm and an average circularity of 0.98 is used. It is desirable that the non-magnetic toner used in the present exemplary embodiment has higher average circularity, more specifically, average circularity of 0.96 or higher. The average circularity according to the present exemplary embodiment is used as a simple method that quantitatively represents the particle shape. The particle shape is measured by using the Flow Type Particle Image Analyzer FPIA-2100 manufactured by Toa Medical Electronics Co., LTD., and the circularity is calculated by the following Equation 1.

Circularity(Ci)=(Circumferential length of circle having the same projection area as the number of particles)/(Circumferential length of particle projection image) (Equation 1)

As expressed by the following Equation 2, a value obtained by dividing the sum of the measured circularity of all particles by the total number of particles is defined as the average circularity.

$$\text{Average circularity } \overline{(C)} = \sum_{i=m}^{m} Ci/m \qquad \text{(Equation 2)}$$

The development apparatus 3 includes a developing roller 31 as a developer carrier and a developing member, a toner supply roller 32 as a developer supply unit, a developer storage chamber 33 for storing the toner T, and a developing blade 34. The toner T stored in the developer storage chamber 33 is stirred by a stirring member 35 and at the same time supplied onto the surface of the developing roller 31 by the toner supply roller 32. When the toner T supplied onto the surface of the developing roller 31 passes through a contact portion between the developing roller 31 and the developing blade 34, the toner T is uniformly thinned and charged to the negative polarity by abrasion charging. Although a one-component non-magnetic contact development method is employed in the present exemplary embodiment, the method is not limited thereto. A two-component non-magnetic contact method, a non-contact development method, or a magnetic development method may be used. Although, according to the present exemplary embodiment, the normal polarity of toner is the negative polarity, the configuration is not limited to thereto. The normal polarity of toner may be a positive polarity. In this case, voltages (described below) may be changed to the opposite polarity as appropriate. The developing roller 31 is rotatably driven in the counterclockwise direction, i.e., in the direction indicated by an arrow R3 in FIG. 1, by the drive motor 110 so that the moving direction of the surface of the photosensitive drum 1 coincides with the moving direction of the surface of the developing roller 31 at a developing portion c where the photosensitive drum 1 and the developing roller 31 comes into contact with each other. The drive motor 110 as a drive unit for driving the developing roller 31 may be a main motor common to the drive unit 110 for driving the photosensitive drum 1. Alternatively, respective different drive motors may rotate the photosensitive drum 1 and the developing roller 31 separately. In the development process, the developing roller 31 is applied with a predetermined developing voltage (developing bias) by a developing power source E2 (FIG. 3) as a developing voltage application unit. According to the present exemplary embodiment, the developing roller 31 is applied with a DC voltage having the negative polarity as the developing voltage. The developing voltage in the development process is set to −300 V. According to the present exemplary embodiment, when the photosensitive drum 1 is uniformly charged and then exposed to light, an exposure surface as an image forming portion where the absolute value of the potential is decreased is formed on the photosensitive drum 1. Then, the toner charged to the negative polarity that is the same as the charging polarity of the photosensitive drum 1 adheres to the exposure surface. This developing method is referred to as a reversal development method.

According to the present exemplary embodiment, the developing roller 31 is configured to be constantly in contact with the photosensitive drum 1 at the developing portion c. However, the developing roller 31 and the photosensitive drum 1 may be configured to be in a contact state and a separated state. In this case, a developing contact and separation mechanism may be separately provided. In a rotational operation that corresponds to a pre-rotation process (described below), the photosensitive drum 1 may be rotated in a state where the developing roller 31 is separated from the photosensitive drum 1.

The toner image formed on the photosensitive drum 1 is passed to a transfer portion d as a contact portion with a transfer roller 5 that is a roller-type transfer member as a transfer unit. According to the present exemplary embodiment, the transfer roller 5 is made of nitrile butadiene rubber (NBR) hydrin-based conductive sponge rubber and has an outer diameter of 12 mm and a hardness of 30 degrees (Asker-C, 500 gf load). The transfer roller 5 is pressed with a predetermined pressure against the photosensitive drum 1. Meanwhile, in synchronization with the toner image on the photosensitive drum 1, a recording material P as a transfer material is conveyed to the transfer portion d from a storage unit 6 by a conveyance roller 8. Then, the toner image on the photosensitive drum 1 is sandwiched between the photosensitive drum 1 and the transfer roller 5 by the action of the transfer roller 5 and transferred onto the conveyed recording material P at the transfer portion d. At this timing, the transfer roller 5 is applied with a predetermined transfer voltage as a DC voltage having a polarity opposite to the normal polarity of the toner (the positive polarity according to the present exemplary embodiment) by a transfer power source E3 (FIG. 3). Thus, an electric field is formed between the transfer roller 5 and the photosensitive drum 1, and the toner image is electrostatically transferred from the photosensitive drum 1 to the recording material P. According to the present exemplary embodiment, the transfer voltage in this transfer process is, for example, +1,000 V. Then, the toner image is electrostatically transferred from the photosensitive drum 1 to the recording material P by the action of the electric field formed between the transfer roller 5 and the photosensitive drum 1.

The recording material P with the toner image transferred thereon is conveyed to a fixing apparatus 9 as a fixing unit. In the fixing apparatus 9, the recording material P is applied with heat and pressure, and the toner image is fixed onto the recording material P.

Meanwhile, residual transfer toner, which remains on the photosensitive drum 1 without being transferred onto the recording material P, passes through a brush portion e as a contact portion with a brush member 10 disposed downstream of the transfer roller 5 in the rotational direction of the photosensitive drum 1. Then, the residual transfer toner is re-charged to the negative polarity by electric discharge at the charging portion a. The negatively charged residual transfer toner reaches the developing portion c with the rotation of the photosensitive drum 1 and then is collected by the development apparatus 3. The brush member 10 according to the present exemplary embodiment will be described below.

2. Brush Member Configuration

The configuration of the brush member 10 according to the present exemplary embodiment will be described below with reference to FIGS. 2A to 2C. As illustrated in FIG. 1, the brush member 10 according to the present exemplary embodiment is fixedly disposed in contact with the surface of the photosensitive drum 1 downstream of the transfer portion d and upstream of the charging portion a in the rotational direction of the photosensitive drum 1.

Figure 2A:
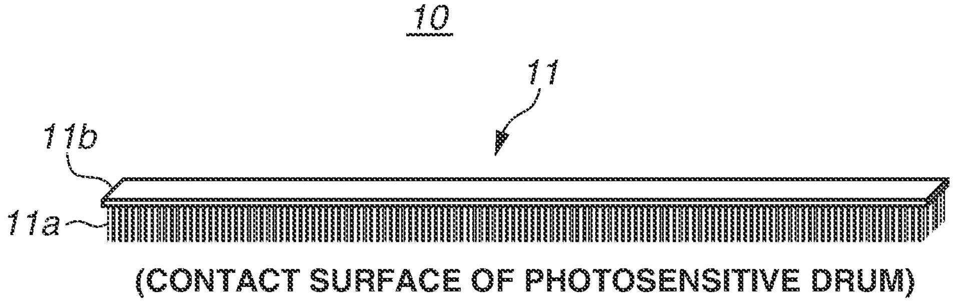
FIGS. 2A to 2C are diagrams schematically illustrating a brush member according to the first exemplary embodiment.

As illustrated in FIG. 2A, the brush member 10 has a function of collecting paper dust transferred from the recording material P onto the photosensitive drum 1 at the transfer portion d to reduce the amount of paper dust which may move to the charging portion a and the developing portion c on the downstream side of the brush member 10. However, in a case where a plurality of recording materials P is fed in succession, for example, paper dust accumulating on the brush member 10 clumps into lumps. When a recording material P is fed thereafter, the paper dust lumps pass through the brush member 10 possibly causing a charging failure. This trouble appears, for example, as "a black spot" on a solid white image (entirely white image).

Figure 2B:
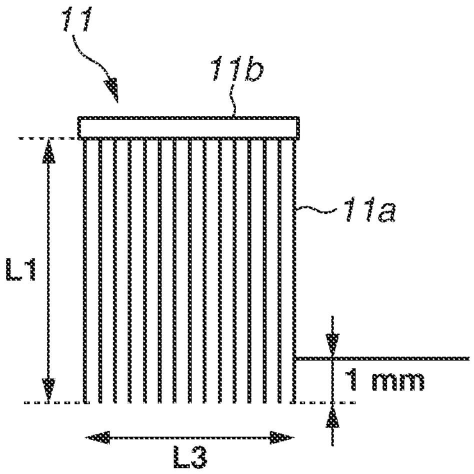
Figure 2C:
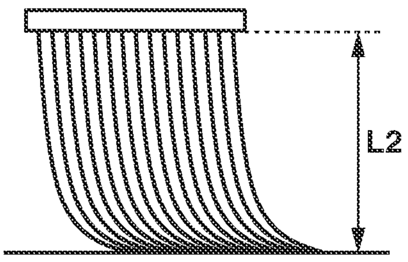

FIG. 2B schematically illustrates the brush member 10 alone when viewed along the longitudinal direction of the brush member 10, which is approximately in parallel with the rotational axis direction of the photosensitive drum 1. FIG. 2C schematically illustrates the brush member 10 in contact with the photosensitive drum 1 when viewed along the longitudinal direction.

A brush portion of the brush member 10 is formed of a conductive fixed brush 11 that is fixedly disposed. The fixed brush 11 is formed of a base cloth 11*b* made of a synthetic fiber containing carbon as a conducting agent, and conductive strings 11*a* made of conductive nylon 6 interwoven in the base cloth 11*b*. The fixed brush 11 is disposed so as to be in contact with the photosensitive drum 1 such that the longitudinal direction of the fixed brush 11 is parallel to the rotational axis direction of the photosensitive drum 1. The fixed brush 11 is disposed so as to be in contact with the photosensitive drum 1 such that the lateral direction of the fixed brush 11 is parallel to the rotational direction of the photosensitive drum 1. The fixed brush 11 is connected with a brush power source E4 (FIG. 3) as a brush voltage application unit.

As illustrated in FIG. 2B, the length from the base cloth 11*b* to the tips of the conductive strings 11*a* exposed therefrom is a distance L1 in a single state, i.e., in a state where no force for bending the conductive strings 11*a* is applied from outside. According to the present exemplary embodiment, the distance L1 is 6.5 mm. The fixed brush 11 is fixed to a supporting member (not illustrated) disposed at a predetermined position of the image forming apparatus 100 by a fixing means such as double-sided adhesive tape, and disposed such that the tips of the conductive strings 11*a* intrudes on the photosensitive drum 1. According to the present exemplary embodiment, the clearance between the above-described supporting member and the photosensitive drum 1 is fixed. As illustrated in FIG. 2C, the shortest distance from the base cloth 11*b* of the fixed brush 11 fixed to the supporting member to the photosensitive drum 1 is a distance L2. According to the present exemplary embodiment, the difference between the distances L2 and L1 is defined as the amount of intrusion by which the fixed brush 11 intrudes on the photosensitive drum 1, which is 1 mm. According to the present exemplary embodiment, as illustrated in FIG. 2B, a length L3 of the fixed brush 11 in the circumferential direction (hereinafter referred to as a "lateral direction") of the photosensitive drum 1 is 5 mm.

According to the present exemplary embodiment, the longitudinal length of the fixed brush 11 is 216 mm. This allows the fixed brush 11 to be in contact with the entire image forming area (the area where a toner image can be formed) on the photosensitive drum 1 in the rotational axis direction of the photosensitive drum 1. According to the present exemplary embodiment, the conductive strings Ila have a thickness of 2 deniers and a density of 240 $kF/inch^2$ ($kF/inch^2$ is a unit of density of a brush and represents the number of filaments per square inch).

Although, according to the present exemplary embodiment, the length L3 of the fixed brush 11 in the circumferential direction (hereinafter referred to as the lateral direction) of the photosensitive drum 1 is set to 5 mm, the length L3 of the fixed brush 11 is not limited thereto. For example, the length L3 may be suitably changed according to the operating life of the image forming apparatus or the process cartridge. It is clear that the longer lateral length of the fixed brush 11 enables collecting paper dust for a longer period of time. However, the larger length L3 requires a length of the photosensitive drum 1 in the circumferential direction to be longer, making it necessary to increase the size of the image forming apparatus 100. Since there has been a demand for decreasing the size of the image forming apparatus 100, it is desirable that the length L3 of the fixed brush 11, which is to be in contact with the photosensitive drum 1 having a 24 mm outer diameter, is 6 mm or less. It is also desirable that the conductive strings 11*a* have a density of 150 $kF/inch^2$ or more.

Although, according to present exemplary embodiment, the length in the longitudinal direction of the fixed brush 11 is set to 216 mm, the length in the longitudinal direction of the fixed brush 11 is not limited thereto. For example, the length in the longitudinal direction of the fixed brush 11 may be suitably changed according to the maximum paper passing width of the image forming apparatus 100.

3. Image Output Operation

According to the present exemplary embodiment, the image forming apparatus 100 performs an image output operation (job) as a series of operations for forming an image on one or a plurality of recording materials Pin response to a single start instruction from an external apparatus (not illustrated) such as a personal computer. Generally, a job includes an image forming process (print process), a pre-rotation process, a sheet interval process in a case of forming an image on a plurality of the recording materials P, and a post-rotation process. The image forming process refers to a period during which an electrostatic image is formed on the photosensitive drum 1, the electrostatic image is developed to form a toner image, the toner image is transferred and then fixed. This period corresponds to an image forming period. More specifically, timings and positions for the electrostatic image formation, toner image formation, toner image transfer, and toner image fixing differ in the image forming period. Therefore, the image forming operation may be defined as an operation up to the toner image transfer or up to the toner image fixing. Even after the image forming operation performed on the photosensitive drum 1 is completed and the operation of the photosensitive drum 1 is changed from the image forming operation to a non-image forming operation, the change of the operation has no influence on the image that has already been transferred onto the recording material P, and therefore the image forming operation may be defined as described above. The pre-rotation process corresponds to a period during which a preparation operation prior to the image forming process is performed. The sheet interval process corresponds to a period between a plurality of recording materials P in a case where the image forming process is performed on the plurality of recording materials P in succession (in continuous image forming). The post-rotation process corresponds to a period during which an organizing operation (preparation operation) is performed after the image forming process. A non-image forming period corresponds to a period other than the image forming period and includes the above-described pre-rotation process, sheet interval process and post-rotation process, and a preliminary rotation process that is a preparation operation to be performed when power of the image forming apparatus 100 is turned ON or when the image forming apparatus 100 is returned from a sleep mode.

4. Control Mode

FIG. 3 is a block diagram schematically illustrating a control mode of a main part of the image forming apparatus 100 according to the present exemplary embodiment. A control unit 150 is included in the image forming apparatus 100. The control unit 150 includes a Central Processing Unit (CPU) 151 as a calculation control unit that serves as a central element in calculation processing, a nonvolatile memory 152 as a storage unit, and an input/output unit (not illustrated) for controlling exchange of signals with various components connected with the control unit 150. The nonvolatile memory 152 is used to temporarily store control data and used as a work area for calculation processing for control. In the present exemplary embodiment, the nonvolatile memory 152 can store information about the number of sheets continuously fed in a case where a plurality of recording materials is fed in succession, and information about the total number of sheets fed by the image forming apparatus 100.

The control unit 150 totally controls the operations of the image forming apparatus 100. The control unit 150 controls transmission and reception of various electrical information signals and drive timings to perform a predetermined image forming sequence. Each unit of the image forming apparatus 100 is connected with the control unit 150. For example, according to the present exemplary embodiment, the control unit 150 is connected with the charging power source E1, the developing power source E2, the transfer power source E3, the brush power source E4, the drive motor 110, and the exposure unit 4.

5. Control for Preventing Paper Dust Clumping

The image forming apparatus 100 according to the present exemplary embodiment is characterized in performing "stop and re-drive" control for temporarily stopping the drive of the photosensitive drum 1 and re-driving the photosensitive drum 1 after 150 ms in the post-rotation process. This control changes the orientation of the conductive strings 11 a relative to the photosensitive drum 1, which enables the paper dust accumulating on the fixed brush 11 to be loosened, thus preventing the paper dust from clumping into lumps.

Figure 4A:
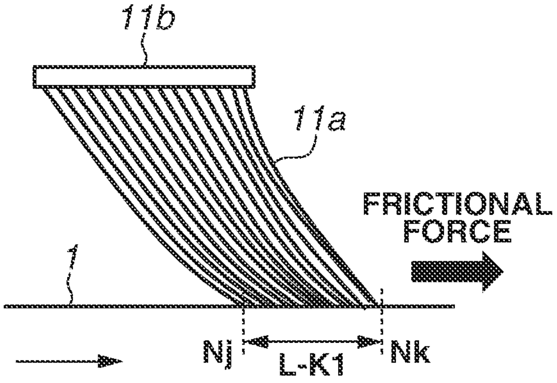
FIGS. 4A and 4B are diagrams each illustrating an orientation of a fixed brush relative to a photosensitive drum according to the first exemplary embodiment.
Figure 4B:
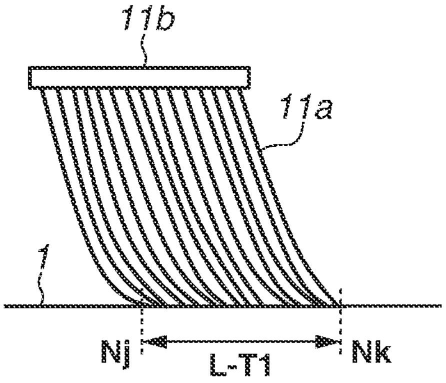

FIGS. 4A and 4B are diagrams each illustrating an orientation of the fixed brush 11 relative to the photosensitive drum 1. The photosensitive drum 1 and the fixed brush 11 are actually disposed such that the fixed brush 11 is in contact with the curved surface of the photosensitive drum 1. FIGS. 4A and 4B illustrate the contact surface of the photosensitive drum 1 with the fixed brush 11 on an assumption that the contact surface, actually a curved surface, is a flat surface. FIG. 4A illustrates the orientation of the fixed brush 11 in the drive state of the photosensitive drum 1, and FIG. 4B illustrates the orientation of the fixed brush 11 immediately after the drive of the photosensitive drum 1 is stopped. From FIGS. 4A and 4B, it can be understood that the orientation of the fixed brush 11 is different between the drive state and the stop state of the photosensitive drum 1. In the drive state, the fixed brush 11 receives a frictional force in the rotational direction of the photosensitive drum 1, and the tips of the conductive strings 11*a* are warped toward the downstream side. In the stop state, the frictional force is released, and the conductive strings 11*a* try to return to their original state by their own elastic force.

According to the present exemplary embodiment, a length from an upstream end Nj to a downstream end Nk of the contact area where the conductive strings 11*a* are in contact with the photosensitive drum 1 is defined as a contact nip width. In this case, the position of the upstream end Nj in the stop state (FIG. 4B) moves farther to the upstream side of the photosensitive drum 1 than the upstream end Nj in the drive state (FIG. 4A). A contact nip width L-T1 in the stop state (FIG. 4B) is larger than a contact nip width L-K1 in the drive state (FIG. 4A). According to the present exemplary embodiment, the upstream end Nj moves by about 1,800 μm, the downstream end Nk moves by about 1,000 μm, and therefore the contact nip width extends by about 800 μm.

Although, according to the present exemplary embodiment, the fixed brush 11 is disposed to be in contact with the photosensitive drum 1 such that the lateral direction thereof is parallel to the rotational direction of the photosensitive drum 1, the configuration is not limited thereto. For example, the lateral direction of the fixed brush 11 may be inclined with respect to the rotational direction of the photosensitive drum 1 so that the contact nip width more largely changes between the drive state and the stop state of the photosensitive drum 1.

In this way, the orientation of the conductive strings 11*a* relative to the photosensitive drum 1 changes as the photosensitive drum 1 changes from the drive state (FIG. 4A) to the stop state (FIG. 4B). More specifically, the upstream end Nj of the contact nip moves upstream of the photosensitive drum 1, and the contact nip width between the conductive strings 11*a* and the photosensitive drum 1 increases. Then, the paper dust accumulating on the fixed brush 11 are loosened and scattered by the above-described action.

Figure 5A:
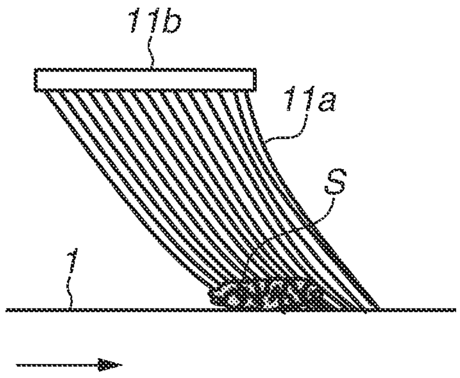
FIGS. 5A and 5B are diagrams each illustrating a state of paper dust at a brush contact portion according to the first exemplary embodiment.
Figure 5B:
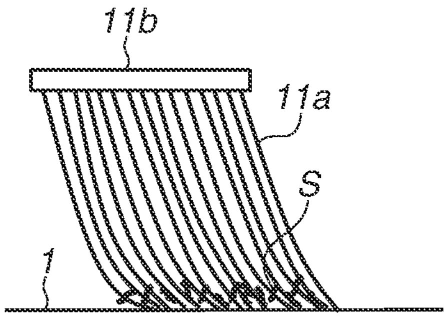

FIGS. 5A and 5B are image diagrams illustrating a state where paper dust S is scattered due to a change in the orientation of the fixed brush 11. FIG. 5A is a diagram illustrating a state where the paper dust S accumulates on the fixed brush 11 when the photosensitive drum 1 is driven. As illustrated in FIG. 5A, the paper dust S is likely to accumulate upstream of the contact nip in the rotational direction of the photosensitive drum 1. FIG. 5B is a diagram illustrating a state where the accumulated paper dust S is scattered when the photosensitive drum 1 is stopped. This is because, when the photosensitive drum 1 stops, the upstream end Nj of the contact nip moves upstream of the photosensitive drum 1 and the contact nip width increases.

Even in a case where a large amount of paper dust S accumulates after a plurality of the recording materials P is fed, the accumulated paper dust S is loosened and scattered, thereby preventing the paper dust S from clumping into lumps.

6. Comparative Test for Image Evaluation

Effects of the "stop and re-drive" control according to the present exemplary embodiment will be described in detail below, together with a comparative example.

A comparative test for image evaluation was performed by feeding 1,000 sheets of recording materials P in a case (first exemplary embodiment) where the "stop and re-drive" control is performed in the post-rotation process and in a case (first comparative example) where the "stop and re-drive" control is not performed in the post-rotation process. For the recording material P in the image evaluation, Xerox Vitality Multipurpose paper of Letter size having a grammage of 75 $g/m^2$ was used.

According to the present exemplary embodiment, a developing voltage in the "stop and re-drive" control is set to +150 V. This is to prevent the toner on the developing roller 31 from transferring onto the photosensitive drum 1 at the developing portion c when the photosensitive drum 1 is stopped and re-driven in a state where the surface potential of the photosensitive drum 1 is reduced by the dark decay. Although, according to the present exemplary embodiment, the developing voltage during the "stop and re-drive" control is +150 V, the developing voltage is not limited thereto. The developing voltage only needs to satisfy a potential relation that does not transfer the negatively charged toner on the developing roller 31 to the photosensitive drum 1. For example, the developing voltage may be suitably changed depending on the stop time of the photosensitive drum 1 or the magnitude of the dark decay of the photosensitive drum 1.

TABLE 1

| Number of fed sheets | | 1-100 | 101-200 | 201-300 | 301-400 | 401-500 |
|---|---|---|---|---|---|---|
| First comparative example | 1-sheet intermittent feed | ○ | ○ | ○ | ○ | ○ |
| | 5-sheet intermittent feed | ○ | ○ | ○ | ○ | ○ |
| | 10-sheet intermittent feed | ○ | ○ | ○ | Δ | Δ |
| First exemplary embodiment | 1-sheet intermittent feed | ○ | ○ | ○ | ○ | ○ |
| | 5-sheet intermittent feed | ○ | ○ | ○ | ○ | ○ |
| | 10-sheet intermittent feed | ○ | ○ | ○ | ○ | ○ |

| Number of fed sheets | | 501-600 | 601-700 | 701-800 | 801-900 | 901-1,000 |
|---|---|---|---|---|---|---|
| First comparative example | 1-sheet intermittent feed | ○ | ○ | ○ | ○ | ○ |
| | 5-sheet intermittent feed | ○ | Δ | ○ | Δ | Δ |
| | 10-sheet intermittent feed | Δ | Δ | x | x | x |
| First exemplary embodiment | 1-sheet intermittent feed | ○ | ○ | ○ | ○ | ○ |
| | 5-sheet intermittent feed | ○ | ○ | ○ | ○ | ○ |
| | 10-sheet intermittent feed | ○ | ○ | ○ | Δ | Δ |

Table 1 illustrates results of evaluating the occurrence of "a black spot" after performing single-sheet intermittent feed where a single-sheet feed as a job is repetitively executed, five-sheet intermittent feed where a five-sheet feed as a job is executed, and 10-sheet intermittent feed where a 10-sheet feed as a job is executed.

The mark "o" denotes no image defect. The mark "Δ" denotes an occurrence of a small black spot of about 1 to 2 mm. The mark "x" denotes an occurrence of a large black spot of 2 mm or larger. The results indicated by the marks o and Δ correspond to a level that has almost no effect on the image.

According to the first comparative example in Table 1, the degree of image degradation due to the black spot increases as the number of fed sheets of a job increases from the single-sheet feed to the five-sheet feed and from the five-sheet feed to the ten-sheet feed. This is because as the number of fed sheets of a job increases, the amount of accumulated paper dust increases in a state where the driving state is maintained and the accumulated paper dust is likely to clump into lumps.

According to the first exemplary embodiment, on the other hand, no black spot occurs in the single-sheet intermittent feed and the five-sheet intermittent feed. A black spot of the Δ level occurs after 801 sheets have been fed in the 10-sheet intermittent feed. It can be understood that an occurrence of a black spot is prevented by performing the "stop and re-drive" control in the post-rotation process.

7. Effects of Present Exemplary Embodiment

As described above, according to the present exemplary embodiment, performing the "stop and re-drive" control in the post-rotation process enables the paper dust accumulating on the brush member to be loosened and scattered, thus preventing the paper dust from clumping into lumps. This can prevent the paper dust from forming into large lumps and accordingly can prevent image defects such as a black spot.

Further, fine paper dust (with a size of 100 μm or less) of the scattered paper dust is allowed to pass through the brush member 10 and then collected by the developing roller 31, thereby making it possible to reduce the total amount of paper dust accumulating on the brush member 10. Scattering paper dust in the fixed brush 11 allows the image forming apparatus 100 to be efficiently maintained without a large amount of paper dust being locally accumulated, and thus the operating life of the image forming apparatus 100 can be extended.

The configuration according to the present exemplary embodiment that can produce the above-described effects will be described below.

The image forming apparatus 100 according to the present exemplary embodiment includes the rotatable photosensitive drum 1, the charge roller 2 for charging the surface of the photosensitive drum 1 at the charging portion a, and the developing roller 31 for supplying toner onto the surface of the photosensitive drum 1 charged by the charge roller 2. The image forming apparatus 100 further includes the transfer roller 5 that comes into contact with the photosensitive drum 1 to form the transfer portion d and transfers the toner supplied onto the photosensitive drum 1 onto the recording material P as a transfer material. The image forming apparatus 100 further includes the brush member 10 (hereinafter also referred to as "brush 10") that is in contact with the surface of the photosensitive drum 1 downstream of the transfer portion d and upstream of the charging portion a in the rotational direction of the photosensitive drum 1. The image forming apparatus 100 includes the drive unit 110 for rotatably driving the photosensitive drum 1, and the control unit 150 for controlling the drive unit 110 to perform the image forming operation. The control unit 150 performs the following control to implement the image forming operation. In the non-image forming operation performed after the image forming operation, the control unit 150 controls the drive unit 110 to perform a switching operation for stopping the photosensitive drum 1 after the photosensitive drum 1 is driven and re-driving the photosensitive drum 1 a plurality of times. In a case of performing the image forming operation including a first image forming operation and a second image forming operation to be performed after the first image forming operation, the control unit 150 performs the following control. In the non-image forming operation performed between the first and the second image forming operations, the control unit 150 controls the drive unit 110 to perform a switching operation for stopping the photosensitive drum 1 after the photosensitive drum 1 is driven and re-driving the photosensitive drum 1 a plurality of times. In a case where the switching operation is performed, the control unit 150 controls the brush 10 to change in orientation to a first orientation when the photosensitive drum 1 is driven and a second orientation when the photosensitive drum 1 is stopped. The brush 10 is a brush fixed to a frame as a supporting member of the photosensitive drum 1, or a pressure brush applied with a predetermined pressure to be pressed against the photosensitive drum 1 by a pressurizing spring.

Although the present exemplary embodiment has been described above centering on an example case where the present disclosure is applied to a DC charging type image forming apparatus, the present disclosure is not limited thereto and is also applicable to an AC charging type image forming apparatus that uses an oscillating voltage composed of superimposed DC and AC voltages (DC and AC components) as the charging voltage.

Although, according to the present exemplary embodiment, only the DC component has been described above as the developing voltage, the developing voltage may be an oscillating voltage composed of superimposed DC and AC voltages (DC and AC components).

Although, in the present exemplary embodiment, a non-magnetic one-component developer is used as the toner, i.e., the developer, a magnetic one-component developer is also applicable.

Further, in the present exemplary embodiment, the brush 11, which is formed of the base cloth 11*b* made of a synthetic fiber containing carbon and the conductive strings 11*a* made of conductive nylon 6 interwoven in the base cloth 11*b*, is used. Alternatively, a non-conductive brush can also be used. The brush 11 can have any structure as long as the orientation of the brush 11 can be sufficiently changed by the "stop and re-drive" control. According to the present exemplary embodiment, the brush 11 has a thickness of 2 deniers, a density of 240 $kF/inch^2$, a conductive string length (L1) of 6.5 mm, and an amount of intrusion of 1 mm. Further, it is desirable to determine the brush configuration in consideration of not only a change in the orientation but also the paper dust collecting efficiency and the toner passage property. As the conductive strings 11*a* are too thin (the fineness is small), the brush 11 is less able to block paper dust. In this case, paper dust passes through the brush 11 and disturbs the charging of the photosensitive drum 1 by the charge roller 2, which can cause image defects. On the other hand, as the conductive strings 11*a* are too thick, the toner passage property deteriorates to cause the toner to be stuck in the brush 11. If the stuck toner is scattered, it can cause a failure such as stain inside the apparatus. It is thus desirable that the conductive strings 11*a* have a thickness of 1 to 10 deniers, and more desirably, 1 to 6 deniers in consideration of the flexible properties of the conductive strings 11*a* to follow the surface of the photosensitive drum 1 in a low-temperature environment. According to the above-described brush structure, it is desirable that the upstream end Nj of the contact nip moves by 500 μm or more, the downstream end Nk thereof moves by 300 μm or more, and therefore the contact nip width extends by 200 μm or more.

Although, in the present exemplary embodiment, the fixed brush 11 fixedly disposed on the photosensitive drum 1 is used, a pressure brush for applying a predetermined pressure to the photosensitive drum 1 is also applicable.

Although, according to the present exemplary embodiment, the image forming apparatus 100 includes the photosensitive drum 1, the development apparatus 3, the charge roller 2, and the brush 10, a form of a process cartridge is also applicable. More specifically, the present exemplary embodiment is also applicable to a process cartridge that is configured to be attached to and detached from the image forming apparatus 100 and includes the photosensitive drum 1, the development apparatus 3, the charge roller 2, and the brush 10. Further, the present exemplary embodiment is also applicable to a configuration including a drum cartridge including the photosensitive drum 1, the charge roller 2 and the brush 10 and a developing cartridge including the development apparatus 3. In this case, both the drum cartridge and the developing cartridge may be detachable to and detachable from the image forming apparatus 100, or either one of the cartridges may be attachable to and detachable from the image forming apparatus 100.

A second exemplary embodiment of the present disclosure will be described below. Basic configurations and operations of the image forming apparatus 100 according to the present exemplary embodiment are the same as those of the image forming apparatus 100 according to the first exemplary embodiment. Therefore, for the image forming apparatus 100 according to the present exemplary embodiment, elements having the same or corresponding functions or configurations as those of the image forming apparatus 100 according to the first exemplary embodiment are assigned the same reference numerals as those of the image forming apparatus 100 according to the first exemplary embodiment, and detailed descriptions thereof will be omitted.

According to the present exemplary embodiment, the brush power source E4 illustrated in FIG. 3 applies a brush voltage to the brush member 10 in the "stop and re-drive" control performed in the post-rotation process.

Brush voltage control in the image forming process will be described below.

1. Brush Voltage Control

The brush member 10 according to the present exemplary embodiment is applied with a predetermined brush voltage as a DC voltage having the negative polarity. The brush power source E4 may apply, for example, a voltage composed of superimposed DC and AC components to the brush member 10. According to the present exemplary embodiment, the brush voltage in the image forming process is −300 V. Meanwhile, the surface potential of the photosensitive drum 1 after a sheet passes through the transfer portion d is about −50 V. Thus, the positively charged toner of the residual transfer toner conveyed from the transfer portion d is primarily collected at the brush portion e by the brush member 10 due to the potential difference between the brush voltage and the surface potential of the photosensitive drum 1. Meanwhile, the negatively charged toner is attracted toward the photosensitive drum 1 at the brush portion e and passes through the brush portion e. The toner that has passed through the brush portion e has desired negatively charged electric charges through uniform electric discharge at the charging portion a. Then, the toner is conveyed to the developing portion c. The toner in non-image regions (unexposed regions) conveyed to the developing portion c transfers to the developing roller 31 due to the potential difference between the dark portion potential (Vd) on the surface of the photosensitive drum 1 and the developing voltage (Vdc), and then is collected by the development apparatus 3. As in the first exemplary embodiment, according to the present exemplary embodiment, the dark portion potential (Vd) is about −600 V, and the developing voltage (Vdc) is −300 V. Meanwhile, the toner in image regions (exposed regions) does not transfer to the developing roller 31 due to the potential difference between the light portion potential (Vl) on the surface of the photosensitive drum 1 and the developing voltage (Vdc) and is conveyed to the transfer portion d with the rotation of the photosensitive drum 1, as image regions, and then transferred onto the recording material P. The light portion potential (Vl) according to the present exemplary embodiment is about −100 V as in the first exemplary embodiment.

Control for preventing the paper dust from clumping into lumps by the brush voltage in the post-rotation process will be described below.

2. Control for Preventing Paper Dust Clumping

Figure 6:
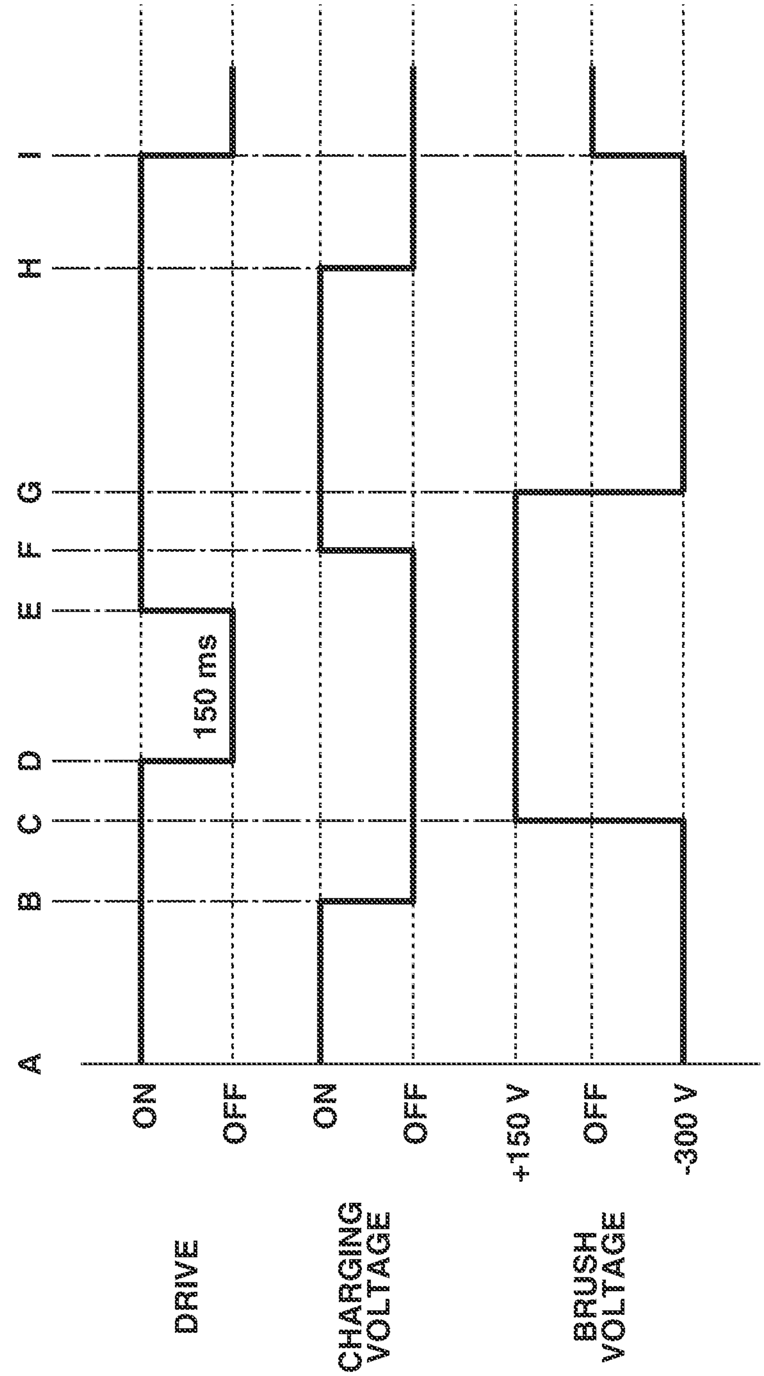
FIG. 6 is a timing chart illustrating a post-rotation process according to a second exemplary embodiment.

FIG. 6 is a timing chart illustrating the post-rotation process according to the present exemplary embodiment. In FIG. 6, a timing A indicates the start timing of the post-rotation process, and the charging voltage at this timing is −1,200 V that is the same as the charging voltage in the image forming process. The brush voltage is −300 V that is the same as the brush voltage in the image forming process.

At a timing B, the charging voltage is turned OFF. This is to prevent damage to the photosensitive drum 1 that can be caused by electric discharge at the charging portion a when the drive of the photosensitive drum 1 is stopped.

At a timing C, the brush voltage is changed from −300 V to +150 V. This is to electrostatically attract the conductive strings 11*a* of the fixed brush 11 to the photosensitive drum 1 by increasing the potential difference with respect to the surface potential of the photosensitive drum 1 (about −600 V).

Although, according to the present exemplary embodiment, the brush voltage is set to +150 V, the brush voltage is not limited thereto. The brush voltage can be set to any value as long as it has a potential difference with respect to the surface potential of the photosensitive drum 1. In an environment susceptible to electric discharge, the potential difference may be equal to or lower than an electric discharge threshold value in consideration of the balance between electric discharge and the electrostatic attraction force.

At a timing D, the drive of the photosensitive drum 1 is stopped. The brush voltage is changed at the timing C in the present exemplary embodiment; however, the timing for changing the brush voltage can be any timing as long as the brush voltage is changed while the drive of the photosensitive drum 1 is stopped. For example, the brush voltage can be changed at a timing the same as the timing D at which the drive of the photosensitive drum 1 is stopped or subsequent timings.

Then, at a timing E at which 150 ms has elapsed since the drive of the photosensitive drum 1 is stopped, the drive of the photosensitive drum 1 is started again. Although, according to the exemplary embodiment, the period of time b from when the drive of the photosensitive drum 1 is stopped to when the drive of the photosensitive drum 1 is restarted is 150 ms, the period of time therebetween is not limited thereto.

At a timing F, the charging voltage is turned ON again. The charging voltage at this timing is −1,200 V.

At a timing G, the brush voltage is changed from +150 V to −300 V. This is to prevent damage to the photosensitive drum 1 that can be caused by electric discharge at the brush portion e when the region on the photosensitive drum 1 where the charging voltage is applied (about −600 V) reaches the brush portion e.

At a timing H, the charging voltage is turned OFF. This is to prevent damage to the photosensitive drum 1 that can be caused by electric discharge at the charging portion a when the drive of the photosensitive drum 1 is stopped.

Finally, at a timing I, the drive of the photosensitive drum 1 is topped and the brush voltage is turned OFF to end the post-rotation process. Although, according to the present exemplary embodiment, the timing at which the brush voltage is turned OFF is the same as the timing at which the drive of the photosensitive drum 1 is stopped, the configuration is not limited thereto.

Figure 7A:
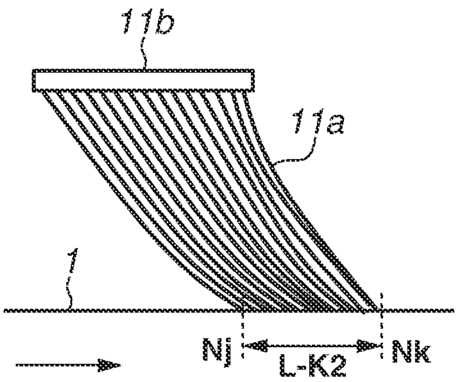
FIGS. 7A and 7B are diagrams each illustrating an orientation of a fixed brush relative to a photosensitive drum according to the second exemplary embodiment.
Figure 7B:
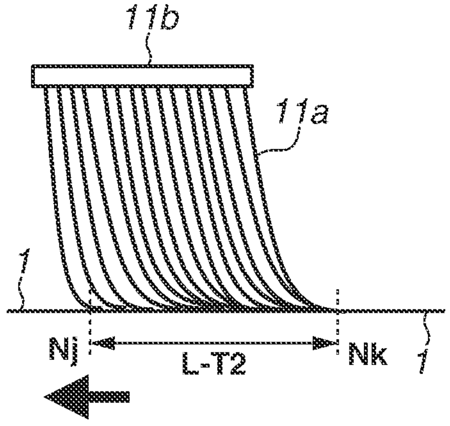

FIGS. 7A and 7B are diagrams each illustrating an orientation the fixed brush 11 relative to the photosensitive drum 1. FIG. 7A illustrates the orientation of the fixed brush 11 in the drive state of the photosensitive drum 1. FIG. 7B illustrates the orientation of the fixed brush 11 immediately after the drive of the photosensitive drum 1 is stopped (between the timings D and E in FIG. 6). Referring to FIGS. 7A and 7B, it can be understood that the orientation of the fixed brush 11 is different between the drive state and the stop state of the photosensitive drum 1, as in the first exemplary embodiment. More specifically, the position of the upstream end Nj in the stop state in FIG. 7B moves farther to the upstream side of the photosensitive drum 1 than the position of the upstream end Nj according to the first exemplary embodiment. A contact nip width L-K2 in the drive state in FIG. 7A more largely extends to a contact nip width L-T2 in the stop state (FIG. 7B) than in the case described in the first exemplary embodiment. This is because the brush voltage having a potential difference with respect to the surface potential of the photosensitive drum 1 is applied to the brush member 10 when the drive of the photosensitive drum 1 is stopped. According to the present exemplary embodiment, the upstream end Nj moves by about 3,000 μm, the downstream end Nk moves by about 1,200 μm, and therefore the contact nip width extends by about 1,800 μm.

As described above, the brush voltage having a potential difference with respect to the surface potential of the photosensitive drum 1 is applied to the brush member 10 when the drive of the photosensitive drum 1 is stopped, so that the moving length of the upstream end Nj is larger than that in a case where the brush voltage is not applied thereto. Then, the above-described action causes paper dust accumulating on the fixed brush 11 to scatter over a wider range, thereby improving the effect of preventing the paper dust from clumping into lumps.

3. Comparative Test for Image Evaluation

Effects of the "stop and re-drive" control according to the present exemplary embodiment will be described in detail below, together with a comparative example.

A comparative test for image evaluation was performed by feeding 10,000 sheets of recording materials in a case (second exemplary embodiment) where the "stop and re-drive" control is performed by applying the brush voltage to the brush member 10 in the post-rotation process and in a case (second comparative example) where the "stop and re-drive" control is performed without applying the brush voltage to the brush member 10 in the post-rotation process. For the recording material P in the image evaluation, Xerox Vitality Multipurpose paper of Letter size having a grammage of 75 g/m$^2$ was used.

TABLE 2

| Number of fed sheets | | 1-1,000 | 1,001-2,000 | 2,001-3,000 | 3,001-4,000 | 4,001-5,000 |
|---|---|---|---|---|---|---|
| Second comparative example | 1-sheet intermittent feed | ○ | ○ | ○ | ○ | ○ |
| | 5-sheet intermittent feed | ○ | ○ | ○ | ○ | ○ |
| | 10-sheet intermittent feed | Δ | Δ | Δ | Δ | Δ |
| Second exemplary embodiment | 1-sheet intermittent feed | ○ | ○ | ○ | ○ | ○ |
| | 5-sheet intermittent feed | ○ | ○ | ○ | ○ | ○ |
| | 10-sheet intermittent feed | ○ | ○ | ○ | ○ | ○ |
| **Number of fed sheets** | | **5,001-6,000** | **6,001-7,000** | **7,001-8,000** | **8,001-9,000** | **9,001-10,000** |
| Second comparative example | 1-sheet intermittent feed | ○ | ○ | ○ | ○ | ○ |
| | 5-sheet intermittent feed | Δ | ○ | Δ | Δ | Δ |
| | 10-sheet intermittent feed | Δ | x | Δ | x | x |

TABLE 2-continued

| | | | | | | |
|---|---|---|---|---|---|---|
| Second exemplary embodiment | 1-sheet intermittent feed | o | o | o | o | o |
| | 5-sheet intermittent feed | o | o | o | o | o |
| | 10-sheet intermittent feed | o | o | Δ | Δ | Δ |

Table 2 illustrates results of evaluating an occurrence of "a black spot" after performing single-sheet intermittent feed where a single-sheet feed as a job is repetitively executed, five-sheet intermittent feed where a five-sheet feed as a job is executed, and 10-sheet intermittent feed where a 10-sheet feed as a job is executed. The mark "o" denotes no image defect. The mark "Δ" denotes an occurrence of a small black spot of about 1 to 2 mm. The mark x denotes an occurrence of a large black spot of 2 mm or larger. The results indicated by the marks o and Δ correspond to a level that has almost no effect on the image.

According to the second comparative example in Table 2, in a case where the brush voltage is not applied to the brush member 10, a black spot of the Δ level occurs after 5,001 sheets have been fed in the five-sheet intermittent feed, and a black spot of the x level occurs after 6,001 sheets have been fed in the 10-sheet intermittent feed.

According to the second exemplary embodiment, on the other hand, no black spot occurs in the single-sheet intermittent feed and the five-sheet intermittent feed, and a black sport of the Δ level occurs after 7,001 sheets have been fed in the 10-sheet intermittent feed. From the results, it can be understood that, when performing the "stop and re-drive" control in the post-rotation process, an occurrence of a black spot can be further prevented by applying the brush voltage having a potential difference with respect to the surface potential of the photosensitive drum 1 to the brush member 10.

4. Effects of Present Exemplary Embodiment

As described above, the present exemplary embodiment makes it possible, when performing the "stop and re-drive" control in the post-rotation process, to scatter paper dust accumulating on the brush member 10 by applying the brush voltage having a potential difference with respect to the surface potential of the photosensitive drum 1 to the brush member 10. This can prevent the paper dust from clumping into lumps and thus can prevent large paper dust lumps from being generated at the brush nip, thereby preventing image defects such as a black spot.

Further, fine paper dust (with a size of about 100 μm or less) of the scattered paper dust is allowed to pass through the brush member 10 and then collected by the developing roller 31, thereby making it possible to reduce the total amount of paper dust accumulating on the brush member 10. Scattering paper dust allows the image forming apparatus 100 to be efficiently maintained without a large amount of paper dust being locally accumulated, and thus the operating life of the image forming apparatus 100 can be extended.

The configuration according to the present exemplary embodiment that can produce the above-described effects will be described below.

The image forming apparatus according to the present exemplary embodiment includes the brush 10 having conductivity, the brush power source E4 (hereinafter also referred to as "the brush voltage power source E4") for applying a voltage to the conductive brush 10, and the control unit 150 for controlling the brush voltage power source E4. When the orientation of the brush 10 is changed from the first orientation to the second orientation, a voltage is applied to the conductive brush 10.

Although the present exemplary embodiment has been described above centering on an example case where the present disclosure is applied to a DC charging type image forming apparatus, the present disclosure is not limited thereto and is also applicable to an AC charging type image forming apparatus that uses an oscillating voltage composed of superimposed DC and AC voltages (DC and AC components) as the charging voltage.

Although, according to the present exemplary embodiment, only the DC component has been described above as the developing voltage, the developing voltage may be an oscillating voltage composed of superimposed DC and AC voltages (DC and AC components).

Although, in the present exemplary embodiment, a non-magnetic one-component developer is used as the toner, i.e., the developer, a magnetic one-component developer is also applicable.

Although, in the present exemplary embodiment, the brush 11, which is formed of the base cloth 11*b* made of a synthetic fiber containing carbon and the conductive strings 11*a* made of conductive nylon 6 interwoven in the base cloth 11*b*, is used, the materials are not limited thereto as long as the brush 11 has conductivity. As in the first exemplary embodiment, it is desirable that the conductive strings 11*a* have a thickness of 1 to 10 deniers, and more desirably, 1 to 6 deniers in consideration of the flexible properties of the conductive strings 11*a* to follow the surface of the photosensitive drum 1 in a low-temperature environment.

Although, in the present exemplary embodiment, the fixed brush 11 fixedly disposed on the photosensitive drum 1 is used, a pressure brush for applying a predetermined pressure to the photosensitive drum 1 is also applicable.

A third exemplary embodiment of the present disclosure will be described below. Basic configurations and operations of the image forming apparatus 100 according to the present exemplary embodiment are the same as those of the image forming apparatus 100 according to the first exemplary embodiment. Therefore, for the image forming apparatus 100 according to the present exemplary embodiment, elements having the same or corresponding functions or configurations as those of the image forming apparatus 100 according to the first exemplary embodiment are assigned the same reference numerals as those of the image forming apparatus 100 according to the first exemplary embodiment, and detailed descriptions thereof will be omitted. As in the second exemplary embodiment, brush voltage control is performed to apply the brush voltage to the brush member 10 in the present exemplary embodiment.

In the present exemplary embodiment, the number of times of the "stop and re-drive" control performed in post-rotation process is changed depending on the number of sheets fed in a single job (hereinafter referred to as the number of continuously fed sheets) in addition to the brush voltage control according to the second exemplary embodiment.

Control for preventing paper dust from clumping into lumps according to the present exemplary embodiment will be described below.

1. Control for Preventing Paper Dust Clumping

TABLE 3

| Number of continuously fed sheets | Number of times of "stop and re-drive" control |
|---|---|
| 1-4 | 0 |
| 5-9 | 1 |
| 10 or more | 2 |

Table 3 illustrates the number of times of the "stop and re-drive" control with respect to the number of continuously fed sheets according to the present exemplary embodiment. As illustrated in Table 3, the number of times of the "stop and re-drive" control to be performed in the post-rotation process is increased as the number of continuously fed sheets is increased. This is because the larger number of continuously fed sheets in a job results in the larger amount of paper dust accumulating on the fixed brush 11, which makes the paper dust more likely to clump into lumps.

As to control timings of the drive, charging voltage, and brush voltage in a case where the "stop and re-drive" control is performed twice, the controls at the timing B and subsequent timings are performed again after the timing G in the timing chart illustrated in FIG. 6, and detailed descriptions thereof will be omitted.

2. Comparative Test for Image Evaluation

Effects of the "stop and re-drive" control according to the present exemplary embodiment will be described in detail below, together with a comparative example.

A comparative test for image evaluation was performed by feeding 10,000 sheets of recording materials P in a case (third exemplary embodiment) where the number of times of the "stop and re-drive" control is changeable depending on the number of continuously fed sheets and in a case (third comparative example) where the "stop and re-drive" control is performed once regardless of the number of continuously fed sheets. For the recording material P in the image evaluation, Xerox Vitality Multipurpose paper of Letter size having a grammage of 75 g/m$^2$ was used.

TABLE 4

| Number of fed sheets | | 1-1,000 | 1,001-2,000 | 2,001-3,000 | 3,001-4,000 | 4,001-5,000 |
|---|---|---|---|---|---|---|
| Third comparative example | 10-sheet intermittent feed | ○ | ○ | ○ | ○ | ○ |
| | 50-sheet intermittent feed | ○ | ○ | ○ | ○ | ○ |
| | 100-sheet intermittent feed | ○ | ○ | ○ | ○ | Δ |
| Third exemplary embodiment | 10-sheet intermittent feed | ○ | ○ | ○ | ○ | ○ |
| | 50-sheet intermittent feed | ○ | ○ | ○ | ○ | ○ |
| | 100-sheet intermittent feed | ○ | ○ | ○ | ○ | ○ |

| Number of fed sheets | | 5,001-6,000 | 6,001-7,000 | 7,001-8,000 | 8,001-9,000 | 9,001-10,000 |
|---|---|---|---|---|---|---|
| Third comparative example | 10-sheet intermittent feed | ○ | ○ | Δ | Δ | Δ |
| | 50-sheet intermittent feed | ○ | Δ | Δ | ○ | Δ |
| | 100-sheet intermittent feed | Δ | ○ | Δ | ○ | Δ |
| Third exemplary embodiment | 10-sheet intermittent feed | ○ | ○ | ○ | ○ | ○ |
| | 50-sheet intermittent feed | ○ | ○ | ○ | ○ | ○ |
| | 100-sheet intermittent feed | ○ | ○ | ○ | ○ | ○ |

Table 4 illustrates results of evaluating an occurrence of "a black spot" after performing 10-sheet intermittent feed where a 10-sheet feed as a job is repetitively executed, 50-sheet intermittent feed where a 50-sheet feed as a job is executed, and 100-sheet intermittent feed where a 100-sheet feed as a job is executed. The mark "o" denotes no image defect. The mark "Δ" denotes an occurrence of a small black spot of about 1 to 2 mm. The results indicated by the marks o and Δ correspond to a level that has almost no effect on the image. Referring to Table 3, since all of the numbers of continuously fed sheets in this evaluation are 10 or more, the numbers of times of the "stop and re-drive" control performed in the post-rotation process according to the third exemplary embodiment are all twice.

According to the third comparative example in Table 4, in a case where the "stop and re-drive" control is performed only once, a black spot of the Δ level occurs after 7,001 sheets have been fed in the 10-sheet intermittent feed, after 6,001 sheets have been fed in the 50-sheet intermittent feed, and after 4,001 sheets have been fed in the 100-sheet intermittent feed.

According to the third exemplary embodiment, on the other hand, no black spot occurs even in the 100-sheet intermittent feed. Thus, the results indicate that an occurrence of the black spot can be further prevented by increasing the number of times of the "stop and re-drive" control performed in the post-rotation process as the number of continuously fed sheets increases. Although the number of times of the "stop and re-drive" control is set to a maximum of twice in the present exemplary embodiment, the number of times of the "stop and re-drive" control is not limited thereto. For example, the number of times of the "stop and re-drive" control may be suitably increased in consideration of a type of paper that is likely to produce paper dust and an environment where paper dust is easily generated. For example, in a case where the same intermittent operation is performed with the same number of fed sheets, the number of times of the "stop and re-drive" control can be set to a greater number in a low-temperature low-humidity environment than in a high-temperature and high-humidity environment.

3. Effects of Present Exemplary Embodiment

As described above, according to the present exemplary embodiment, paper dust accumulating on the brush member 10 can be further scattered by increasing the number of times of the "stop and re-drive" control performed in the post-rotation process as the number of continuously fed sheets increases. This can prevent the paper dust from clumping into lumps and thus can prevent large paper dust lumps from being generated at the brush nip, thereby preventing image defects such as a black spot.

Further, fine paper dust (with a size of 100 μm or less) of the scattered paper dust is allowed to pass through the brush member 10 and then collected by the developing roller 31, making it possible to reduce the total amount of paper dust accumulating on the brush member 10. Scattering paper dust in the fixed brush 11 allows the image forming apparatus 100 to be efficiently maintained without a large amount of paper dust being locally accumulated, and thus the operating life of the image forming apparatus 100 can be extended.

A configuration according to the present exemplary embodiment that can produce the above-described effects will be described below.

The image forming apparatus 100 according to the present exemplary embodiment includes the rotatable photosensitive drum 1, the charge roller 2 for charging the surface of the photosensitive drum 1 at the charging portion a, and the developing roller 31 for supplying toner onto the surface of the photosensitive drum 1 charged by the charge roller 2. The image forming apparatus 100 further includes the transfer roller 5 that comes into contact with the photosensitive drum 1 to form the transfer portion d and transfers the toner supplied onto the photosensitive drum 1 onto the recording material P as a transfer material. The image forming apparatus 100 further includes the brush 10 that is in contact with the surface of the photosensitive drum 1 downstream of the transfer portion d and upstream of the charging portion a in the rotational direction of the photosensitive drum 1. The image forming apparatus 100 further includes the drive unit 110 for rotatably driving the photosensitive drum 1, the control unit 150 for controlling the drive unit 110 to perform the image forming operation, and the memory 152 for storing information about the image forming operation. The control unit 150 performs the following control to implement the image forming operation. In the non-image forming operation performed after the image forming operation, the control unit 150 controls the drive unit 110 to perform a switching operation for stopping the photosensitive drum 1 after the photosensitive drum 1 is driven and then re-driving the photosensitive drum 1 a plurality of times based on the information about the image forming operation. In a case of performing the image forming operation including a first image forming operation and a second image forming operation performed after the first image forming operation, the control unit 150 performs the following control. In the non-image forming operation performed between the first and the second image forming operations, the control unit 150 controls the drive unit 110 to perform a switching operation for stopping the photosensitive drum 1 after the photosensitive drum 1 is driven and then re-driving the photosensitive drum 1 a plurality of times based on the information about the image forming operation. In a case where the switching operation is performed, the control unit 150 controls the brush 10 to change in orientation to a first orientation when the photosensitive drum 1 is driven and a second orientation when the photosensitive drum 1 is stopped. The brush 10 is a brush fixed to a frame as a supporting member of the photosensitive drum 1 or a pressure brush applied with a predetermined pressure to be pressed against the photosensitive drum 1 by a pressurizing spring. The information about the image forming operation refers to the number of continuously fed sheets, in a case where a plurality of recording materials P is fed in succession, and the number of times of the switching operation is controlled to increase as the number of continuously fed sheets increases. Further, the information about the image forming operation also refers to the total number of sheets fed by the image forming apparatus 100, and the number of times of the switching operation is controlled to increase as the total number of fed sheets increases.

Although the present exemplary embodiment has been described above centering on an example case where the present disclosure is applied to a DC charging type image forming apparatus, the present disclosure is not limited thereto and is also applicable to an AC charging type image forming apparatus that uses an oscillating voltage composed of superimposed DC and AC voltages (DC and AC components) as the charging voltage.

Although, according to the present exemplary embodiment, only the DC component has been described above as the developing voltage, the developing voltage may be an oscillating voltage composed of superimposed DC and AC voltages (DC and AC components).

Although, in the present exemplary embodiment, a non-magnetic one-component developer is used as the toner, i.e., the developer, a magnetic one-component developer is also applicable.

Although, in the present exemplary embodiment, the brush 11, which is formed of the base cloth 11*b* made of a synthetic fiber containing carbon and the conductive strings 11*a* made of conductive nylon 6 interwoven in the base cloth 11*b*, is used, the materials are not limited thereto as long as the brush 11 has conductivity. As in the first exemplary embodiment, it is desirable that the conductive strings 11*a* have a thickness of 1 to 10 deniers, and more desirably, 1 to 6 deniers in consideration of the flexible properties of the conductive strings 11*a* to follow the surface of the photosensitive drum 1 in a low-temperature environment.

Although, in the present exemplary embodiment, the fixed brush 11 fixedly disposed on the photosensitive drum 1 is used, a pressure brush for applying a predetermined pressure to the photosensitive drum 1 is also applicable.

A modification of the present disclosure will be described below.

According to the present modification, control is performed such that the number of times of the “stop and re-drive” control is changed depending on the total number of sheets fed by the image forming apparatus 100 in addition to the control for changing the number of times of the “stop and re-drive” control depending on the number of continuously fed sheets according to the third exemplary embodiment.

Control for preventing paper dust from clumping into lumps according to the present modification will be described below.

1. Control for Preventing Paper Dust Clumping

TABLE 5

| Total number of fed sheets | Number of continuously fed sheets | Number of times of “stop and re-drive” control |
|---|---|---|
| 1-4,000 | Any | 0 |
| 4,001 or more | 1-4 | 0 |
| | 5-9 | 1 |
| | 10 or more | 2 |

Table 5 illustrates the number of times of the “stop and re-drive” control with respect to the total number of fed sheets and the number of continuously fed sheets according to the present modification. As illustrated in Table 5, when the total number of fed sheets is 4,000 or less, the number of times of the “stop and re-drive” control is set to 0 (zero) regardless of the number of continuously fed sheets. This is because the total amount of paper dust accumulating on the fixed brush 11 is small and thus the paper dust is less likely to clump into lumps. In this manner, the “stop and re-drive” control is performed only when necessary and is not performed when not necessary to shorten the time of the post-rotation process, which accordingly makes it possible to prevent degradation of the photosensitive drum 1 and other key components. Although, in the present modification, the number of times of the “stop and re-drive” control is set to 0 (zero) when the total number of fed sheets is 4,000 or less, the number of times of the “stop and re-drive” control is not limited thereto. The “stop and re-drive” control can be performed the number of times suitable for the total number of fed sheets and the number of continuously fed sheets depending on the operating life of the image forming apparatus 100.

2. Effects of Present Modification

As described above, according to the present modification, the number of times of the “stop and re-drive” control is set to a variable number of times, and the “stop and re-drive” control is performed a required minimum number of times depending on the total number of sheets fed by the image forming apparatus 100. This can reduce the time of the post-rotation process while preventing image defects such as a black spot, which accordingly makes it possible to prevent deterioration of the photosensitive drum 1 and other key components.

Although the present modification has been described above centering on an example case where the present disclosure is applied to a DC charging type image forming apparatus, the present disclosure is not limited thereto and is also applicable to an AC charging type image forming apparatus that uses an oscillating voltage composed of superimposed DC and AC voltages (DC and AC components) as the charging voltage.

Although, according to the present exemplary embodiment, only the DC component has been described above as the developing voltage, the developing voltage may be an oscillating voltage composed of superimposed DC and AC voltages (DC and AC components).

Although, in the present exemplary embodiment, a non-magnetic one-component developer is used as the toner, i.e., the developer, a magnetic one-component developer is also applicable.

Although, in the present exemplary embodiment, the brush 11, which is formed of the base cloth 11*b* made of a synthetic fiber containing carbon and the conductive strings 11*a* made of conductive nylon 6 interwoven in the base cloth 11*b*, is used, the materials are not limited thereto as long as the brush 11 has conductivity. As in the first exemplary embodiment, it is desirable that the conductive strings 11*a* have a thickness of 1 to 10 deniers, and more desirably, 1 to 6 deniers in consideration of the flexible properties of the conductive strings 11*a* to follow the surface the photosensitive drum 1 in a low-temperature environment.

Although, in the present exemplary embodiment, the fixed brush 11 fixedly disposed on the photosensitive drum 1 is used, a pressure brush for applying a predetermined pressure to the photosensitive drum 1 is also applicable.

As described above, the present disclosure makes it possible to prevent image defects caused by paper dust accumulating on a brush.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-154909, filed Sep. 28, 2022, which is hereby incorporated by reference herein in its entirety.

What is claimed is:

1. An image forming apparatus comprising:

a photosensitive drum that is rotatable;

a charging member configured to charge a surface of the photosensitive drum at a charging portion;

a developing member configured to supply toner onto the surface of the photosensitive drum charged by the charging member;

a transfer member configured to come into contact with the photosensitive drum to form a transfer portion, and transfer the toner supplied onto the photosensitive drum to a transfer material at the transfer portion;

a brush configured to come into contact with the surface of the photosensitive drum downstream of the transfer portion and upstream of the charging portion in a rotational direction of the photosensitive drum;

a drive unit configured to rotatably drive the photosensitive drum;

a control unit configured to control the drive unit to perform an image forming operation; and a memory configured to store information about the image forming operation, wherein, in a case where the image forming operation is performed and a non-image forming operation is performed after the image forming operation, the control unit performs control such that a switching operation for stopping the photosensitive drum after the photosensitive drum is driven and re-driving the photosensitive drum is performed a plurality of times based on the information about the image forming operation, and wherein, in a case where the switching operation is performed, the control unit controls the brush to change in orientation to a first orientation when the photosensitive drum is driven and a second orientation when the photosensitive drum is stopped.

2. The image forming apparatus according to claim 1, wherein, in a case where a first image forming operation and a second image forming operation to be performed after the first image forming operation are performed as the image forming operation and the non-image forming operation is performed between the first image forming operation and the second image forming operation, the control unit performs control such that the switching operation for stopping the photosensitive drum after the photosensitive drum is driven and re-driving the photosensitive drum is performed the plurality of times based on the information about the image forming operation.

3. The image forming apparatus according to claim 1, wherein the brush is a brush fixedly disposed on a supporting member of the photosensitive drum, or is a pressure brush applied with a predetermined pressure to be pressed against the photosensitive drum by a pressurizing spring.

4. The image forming apparatus according to claim 1, wherein the information about the image forming operation is a number of continuously fed sheets in a case where a plurality of recording materials is fed in succession, and wherein a number of times of the switching operations increases as the number of continuously fed sheets increases.

5. The image forming apparatus according to claim 1, wherein the information about the image forming operation is a total number of sheets fed by the image forming apparatus, and wherein a number of times of the switching operations increases as the total number of fed sheets increases.

6. The image forming apparatus according to claim 1, further comprising a brush voltage power source configured to apply a voltage to the brush, wherein the brush is a conductive brush, and wherein, in a case where the switching operation is performed, the control unit controls the brush voltage power source to apply the voltage to the conductive brush.

7. The image forming apparatus according to claim 1, wherein the toner is a one-component developer.

8. The image forming apparatus according to claim 1, wherein the charging member is configured to come into contact with the surface of the photosensitive drum to form the charging portion.

9. The image forming apparatus according to claim 1, wherein the brush has a density of 150 $kF/inch^2$ or more.

* * * * *